(12) United States Patent  
Scott

(10) Patent No.: US 10,065,333 B2  
(45) Date of Patent: Sep. 4, 2018

(54) UNIVERSAL ROUTER SYSTEM

(71) Applicant: George Victor Scott, Winnipeg (CA)

(72) Inventor: George Victor Scott, Winnipeg (CA)

( * ) Notice: Subject to any disclaimer, the term of this patent is extended or adjusted under 35 U.S.C. 154(b) by 898 days.

(21) Appl. No.: 14/288,334

(22) Filed: May 27, 2014

(65) Prior Publication Data

US 2015/0266202 A1    Sep. 24, 2015

Related U.S. Application Data

(60) Provisional application No. 61/967,522, filed on Mar. 21, 2014.

(51) Int. Cl.
  *B26D 7/00*  (2006.01)
  *B23Q 9/00*  (2006.01)

(52) U.S. Cl.
  CPC .......... *B26D 7/0006* (2013.01); *B23Q 9/0014* (2013.01)

(58) Field of Classification Search
  CPC ........ B26D 7/0006; B23Q 9/0014; B27C 5/10
  See application file for complete search history.

(56) References Cited

U.S. PATENT DOCUMENTS

| 3,635,268 A | * | 1/1972 | Lange ................. B23Q 1/4809 144/136.95 |
| 4,044,805 A | * | 8/1977 | Gronholz ............... B23C 3/126 144/136.95 |
| 4,062,390 A | * | 12/1977 | Beekenkamp ....... B23Q 9/0092 144/154.5 |
| 4,114,664 A | * | 9/1978 | Cotton .................... B27C 5/00 125/8 |
| 4,185,671 A | * | 1/1980 | Cotton .................... B27C 5/00 144/137 |
| 4,793,604 A | * | 12/1988 | Taylor ................... B27B 27/02 269/303 |
| 4,911,214 A | * | 3/1990 | Scott .................... B23Q 9/005 144/136.95 |

* cited by examiner

Primary Examiner — Christopher R Harmon
(74) Attorney, Agent, or Firm — George V. Scott

(57) ABSTRACT

This present invention describes and relates a system including a plurality of parts and features allowing the user to creatively and accurately operate a router be able to make several different cuts and create new cut designs on a piece of wood. This inventive new system includes an on board clampable on board adjustable miter gauge including an elongated slotted plate device suitably attached to a protractor on the miter gauge which guide means with suitably attached sleeve may be swung to the right or left through an arcuate slot through which a threaded means pass through and into and through a suitable opening through said opening in miter gauge thus allowing angular settings allowing for freehand lettering, pictures, mechanical lettering, wood joints and other creative cuts without the need of patterns stencils and templates.

3 Claims, 6 Drawing Sheets

UNIVERSAL ROUTER SYSTEM

BACKGROUND OF THE INVENTION

This new invention relates to an all in one router system known now as the universal router system. Prior to the present time, known router guides were not designed to do more than one operation and were costly and for the most part were difficult to use. Some of the generally known guides are: Lang U.S. Pat. No. 3,635,268, Bloch U.S. Pat. No. 4,538,946 and most notably Scott U.S. Pat. No. 4,911,204 are known to applicant and only one is generally similar to the present application.

There are a great many people who are woodworking hobbyists from all age groups, men women and children. Most people are afraid of the router and don't know how to use it except for doing operations that involve no control required from the user such as edge shaping. Also fear has been a major setback for a great many people because the router is a very powerful power tool and can be, dangerous if one does not understand it. The very few router guides that are available today are expensive, difficult to set up, mostly bulky and awkward to use and if properly used require a great deal of practice to be very good with them, thus they are basically a waste of time. Also all of them are dedicated to only one operation on one make of router and the cost does not justify the purchase. The cost and ability to use the apparatus were not in place and therefore many people have lost interest in the purpose of the router. A great many people own a router but very seldom use it, as a result of these disadvantages.

All of these reasons are very good reasons for not wanting to use or even try to use the router and this has created a demand for something that would be a device that would be easy to use, be multi-purpose or universal in use and be a tool that one would not be afraid to use with a router.

Another very important point is the fact that if one bought an ABC guide; it would only work with the manufacturer's router. If one bought router guide ABC then one would have to use it with ABC router. If one wanted to do another operation they have to buy another guide. With all of these reasons to not use the router it now sits gathering dust. What is now in demand is one router system that will work with any router and that same router system does almost or all operations one might want to do with a router. These operations also should be easy to learn and not require a lot of time to set up and do. It should be safe and be useable by anyone old enough that has the need or desire to use a router. Junior and senior high schools should be able to teach their students the safe use of the router so when they finish school they can carry forward what they know in later life.

These are some of the reasons why the need has arisen for the present invention. One router system for all routers. If one owns a router they need the universal router system

SUMMARY OF THE INVENTION

This invention relates to a universal router system which includes few interrelated devices and options. An arcuate slot formed therein as of a protractor part is one of the different aspects and included in the following features and objects of the invention that will be discussed later in this application.

[a] The primary and most important part of this inventive router system includes the clampable on board miter gauge able to be suitably clamped to a suitable piece of wood with adjustable clamping means.

[b] Suitably and pivotably attached to the protractor of the miter gauge is a slotted plate means. One end of said slotted plate means is suitably attached at a pivot point on said protractor so as to align said slotted plate with the different angles on arcuate slot to cut on a piece of wood when miter gauge is suitably clamped to said piece of wood. Said slot of suitable length and suitable width in said slotted plate is linearly centered on said plate and tightening means through arcuate slot will be discussed later in this application as will slotted plate top surface.

[c] Slidably attached to slotted plate which is attached to said miter gauge is an upright guide support means having aligned openings at each end hereinafter referred to as a sleeve, is attached with a plurality of tightening means. Said sleeve is slidable from detached end of said slotted plate to the miter gauge end and may be tightened in any position. Sleeve has tightening means on top and on bottom through slot in plate. Top tightening means will be discussed with beam insertion into sleeve. Later.

[d] A beam device is slidably mounted through said aligned sleeve openings guide means. At the miter gauge end of said beam is attached a moveable hinge which in turn attaches to an attaching system for router attachment. Said beam device may be tightened in any position in said sleeve device using top tightening device in sleeve. Said beam may be of any shape of course thus changing the shape of said supporting sleeve.

[e] Bottom and top clamp plates are features of the inventive system but not part of this patent application because this clamping system is not new. A plurality of top clamp plates are 90 degree extensions from top of miter gauge body, 180 degrees from direction of protractor to portion of miter gauge. They are of suitable size, shape and place so as to be able to accept and firmly hold a piece of wood placed under and clamped against them and are of a distance apart so that a regular router can liberally pass between them. The bottom clamp plate is also an extension of 90 degrees from bottom of miter gauge also 180 degrees to the protractor of miter as a flat single plane extending from outside edge to outside edge of top clamp plates. The distance between the top surface of bottom clamp plate and bottom surface of top clamp plates is adequate more than sufficient to clamp average sized pieces of wood to top edge of an average work bench to cut. Threadably passing through said bottom clamp plate is a plurality of threaded posts with suitable systems at each end of said posts for adjusting and clamping said wood and work bench at edge of bench for cutting. Of course other clamping systems could apply.

[f] Also as a feature of this very inventive system is the cutting bit notch for bit entry for through edge to edge cuts such as dados and other wood joints. Said notch is formed therein in the front part of the protractor edge and the top front part of the drop plate, forming part of the clamping system, said therein notch as suitably sized and shaped opening for safe full bit entry.

[g] It is also an object of the invention of this universal router system that it has an attachment as not used with said miter gauge but with said sliding beam only. Said feature is a radius plate with a plurality of support sleeve means with tightening means to secure said beam. A hole at one end for tack for center. Obviously tack not inventive.

It is a further object of the invention that the use of the router can now be universal in use by everyone with almost any router to be able to perform almost any operation requiring a router, with accuracy, ease and with little practice and little set up time and safer.

Of course there are still few operations that don't require a system such as shaping an edge because there are bearing bits on which the bearing is the guide.

All of these objects and aspects of this invention will become better understood with the pictures and details and involved descriptions of the accompanying drawings and the embodiments of this invention.

DESCRIPTION OF THE SPECIFIC EMBODIME

Figure 1:
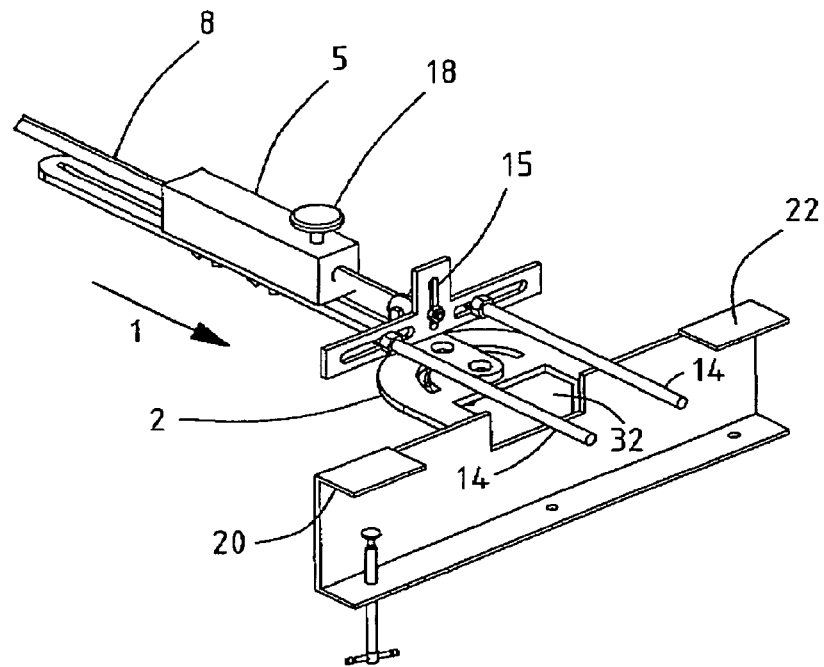
FIG. 1 Shows a pictorial view of a new and inventive adjustable on board miter gauge with most of the features and attachments as parts of the inventive universal router system.

With first reference to FIG. 1, the first designation is number 1 seen to show the adjustable on board miter gauge and further parts of the system although beam 8 and router attaching system are not part of the miter gauge but still included. Sleeve 5 can also be attachably removeable.

Figure 7:
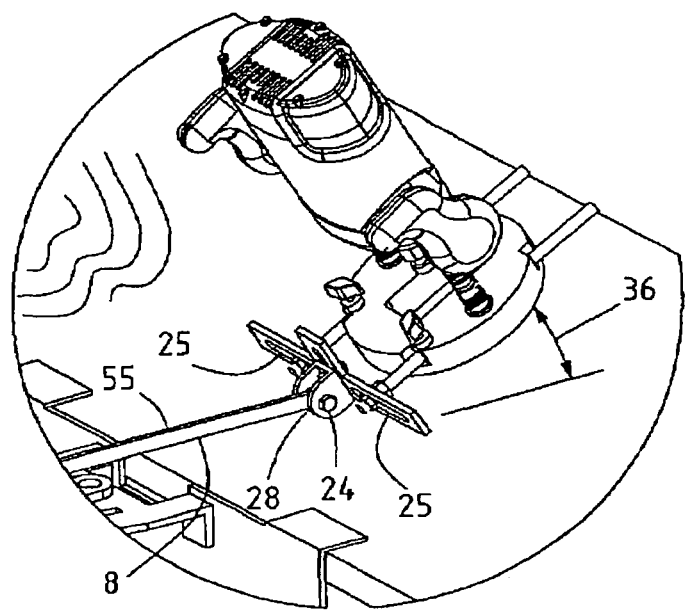
FIG. 7 Shows a pictorial of a router in a tilt position because of the inventive use of the hinge.
Figure 8:
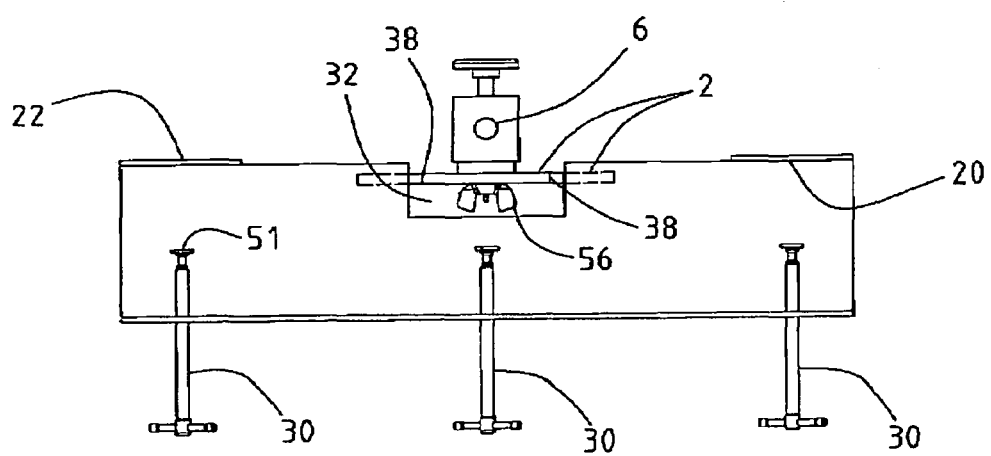
FIG. 8 shows the orthographic front view of the inventive miter gauge.
Figure 9:
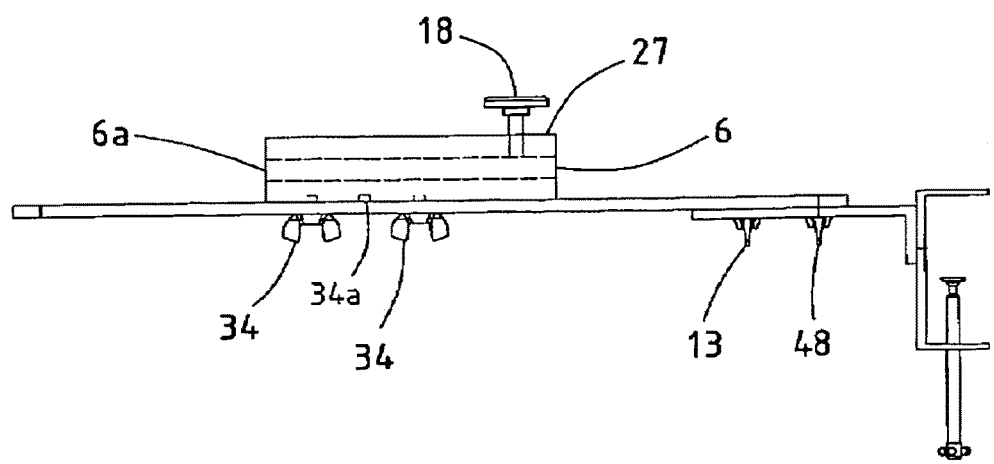
FIG. 9 Shows the orthographic side view of the inventive miter gauge.

With reference to FIGS. 1-9; firstly FIG. 1 to include attachable detachable sleeve 5 adjustable through slot 4 of slotted sleeve plate 3 using adjustments 34 shown in FIG. 9. Also shown in FIG. 9 is threaded insert 18 as locking adjustment device on sleeve 5 for beam 8 used to allow beam 8 to slide through sleeve 5 and be locked in selected position. Threaded insert 13 through arcuate slot 38 therein protractor 2 better seen as 13 in FIG. 9 is used to lock slotted sleeve plate 3 and sleeve 5 at desired angle.

Figure 3:
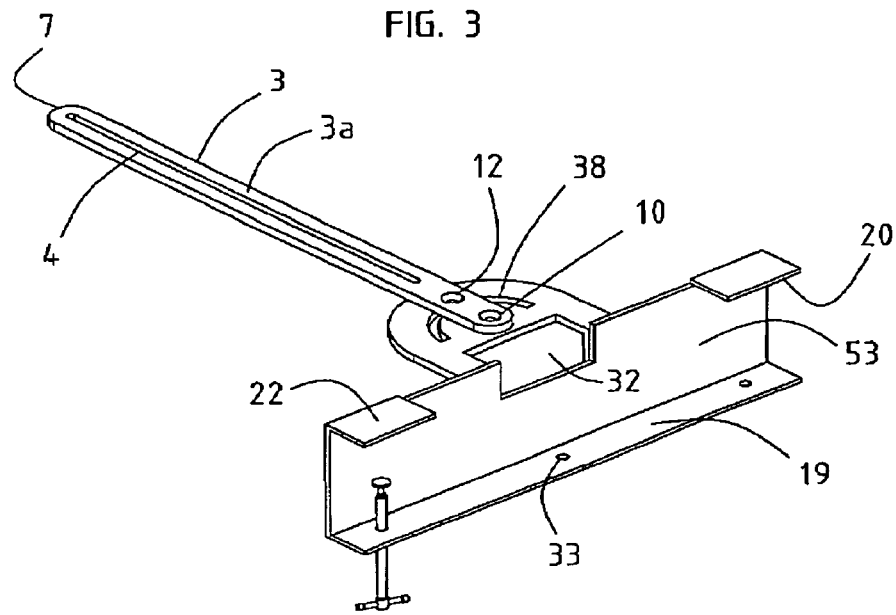
FIG. 3 Shows a pictorial view of the adjustable on board miter gauge with an attachable, detachable or Permanently attached slotted sleeve plate.

Said slotted plate 3 with suitable slot 4 as seen in FIG. 3 is attachably detachable or permanently and positionaly attached with fastener 10 to protractor 2 for said pivotal movement. Said sleeve 5 is adjustable with fastener 13 through threaded bore in plate 3 seen in FIG. 3 used to pivot sleeve plate 3 to allow sleeve 5 to pivot to desired angles and to lock at said angles and to position sleeve 5 in desired position. Adjustment fixtures 34 in sleeve 5 through slot 4 adjust to be able to slide sleeve 5 and set it to desired position on sleeve plate 3 through slot 4. Also in miter gauge 1 to be discussed later in this application are cuts such as dados 45 in FIG. 4 cuts allowing a router 37 to move off wood with bit notch 32 allowing bit into notch 32 thus allowing said router 37 to slide onto slotted plate 3 for through cut shown in FIG. 4.

Figure 4:
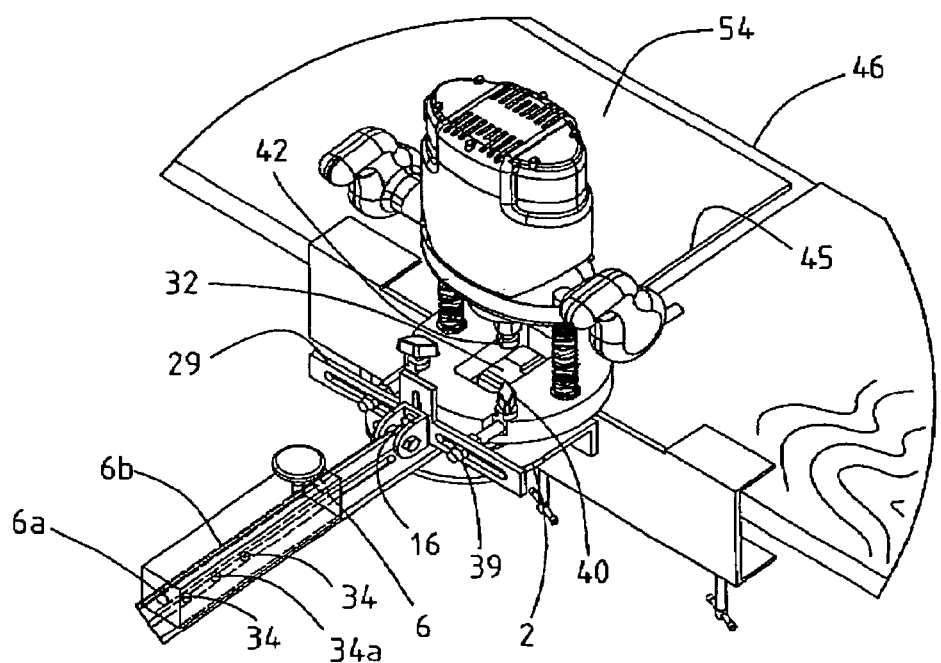
FIG. 4 Shows a pictorial view of a router having finished cutting a dado wood joint with the router cutter inside the bit notch and router sitting on sleeve plate on protractor and partly still on the wood.

With reference to FIG. 1, bottom surface 20 of top plate clamps 22 of miter gauge 1 clamping system, it will be better shown later in this application that surface 20 is on the same plane as top surface 3a of slotted sleeve plate 3 so when miter gauge is clamped to said material that said material, wood 54, top surface will be on the same plane as 3a and 20 thus placing the router 37 on the same plane thus allowing said router base surface 37 to be slideably allowed onto top surface 3a of slotted plate 3 and bit notch 32 allowing bit or cutter 42 passage into notch 32 as in FIG. 4. Clamping system of miter gauge 1, consists of a plurality of threaded rods 30 through threaded passages 33 in bottom clamp plate extension 19. Said clamping system is not inventive as any suitable clamping system could be used.

Figure 2:
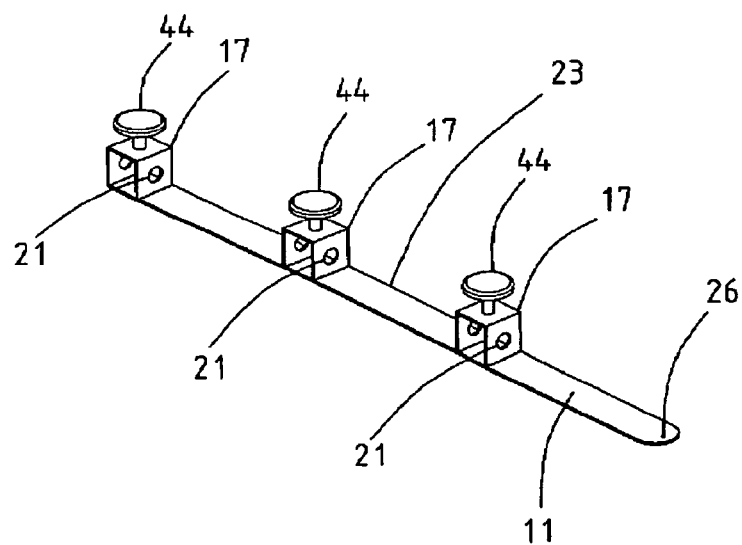
FIG. 2 Shows a pictorial view of a radius plate with a plurality of upright sleeve passage ways and a radial center tack opening passage at the long end.

With reference to FIG. 2, radius plate 23 with a plurality of upright aligned openings 21 in sleeves 17 and adjusting threaded inserts 44 through threaded passages in sleeves 17 and aligned openings 21 with a tack passage 26 at the suitable end for radial placement. With beam 8 attached to hinge 9 with fastener 24 and t-bar 29 upright 50 in FIG. 6 and t-bar upright 50 attached to hinge with fastener 35 in FIG. 11 and with router attaching rods 14 in place in slots 25 in t-bar 29 arms but not as part of the miter gauge. Beam 8 slides through sleeves 21 and snugged onto sleeve flat 55. With attaching rods 14 in place they are now inserted into router openings and adjustments 40 tightened. Tack for desired radius.

With reference again to FIG. 3 and FIG. 9; 12 refers to threaded bore through sleeve plate 3 aligned with arcuate slot 38 and 13 through arcuate slot 38 and threaded bore 12 in FIG. 3 and threaded fastener 13 through 12 for tightening said slotted sleeve plate to protractor in desired angular position.

Figure 5:
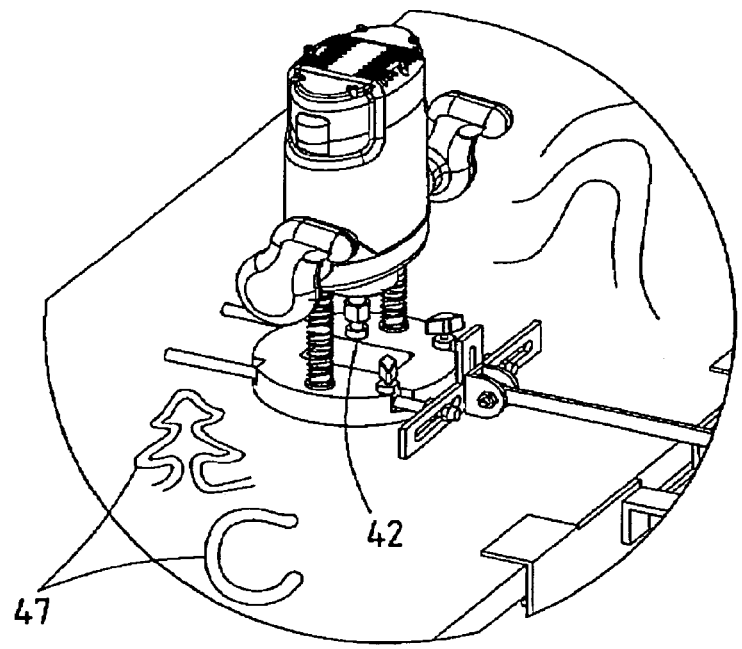
FIG. 5 Shows a pictorial view of the inventive system allowing a router to cut semi-freehand lettering and semi-freehand artwork.
Figure 6:
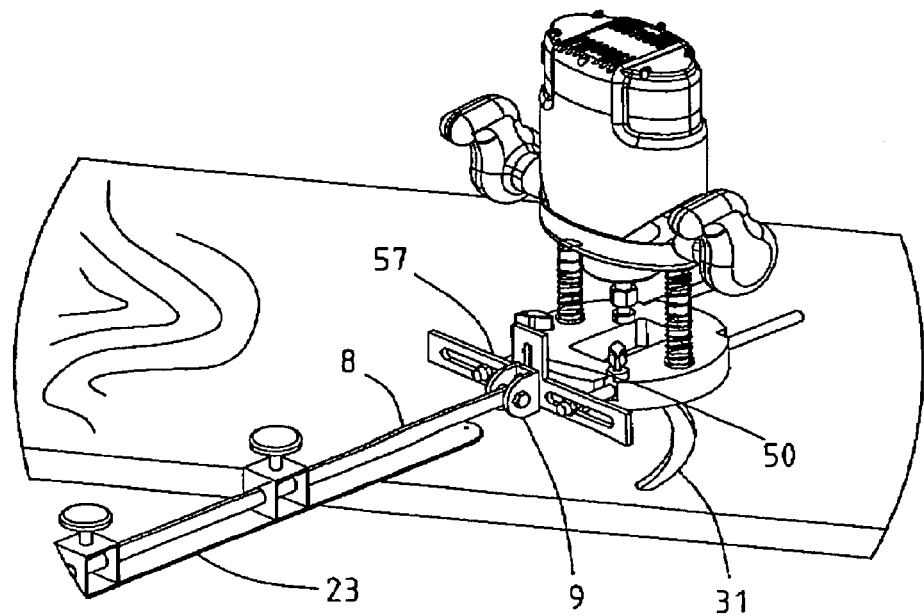
FIG. 6 Shows a pictorial view of part of the inventive system, the radius plate engaged with the beam; the relationship being independent of the miter gauge.

With reference to FIG. 7 it is seen that said router 37 has the advantage of being able to be tilt lifted 36 because of the inclusion of hinge 9 and fastener 24. Of course said hinge 9 could be of any kind, be it as simple as this one or more complex. For the purpose of this concept it is simple. The hinge 9 with this system makes it simple to do semi-freehand lettering 47 as well as semi- freehand art 47. Because the router tilt 36 has no effect on the stability of the miter gauge being clamped 30, 51, 19 at a distance from the edge of the wood, close or far from the edge of orientation makes no difference. The router is tilted 36 in FIG. 4 to move from letter 47 to letter or picture 47 part to part. Hinge opening 28 with beam attachment means 24 in FIG. 7 shows this clearly. Also of critical importance is the fact that the miter gauge sleeve 5 and beam 8 have about 90% control of the router. This control is attributed to being able to have 360 degree circular and oval control shown by angular and rotary movement with free movement under 90% control when cutting semi-freehand. With very little practice, one can be even better. You can't put a number on talent. Beam 8 is shown to have flat 55 on top as beam 8 is round but may be any shape as sleeve also, but flat prevents beam 8 from rotation when adjustment 18 is tightened. With reference to FIG. 5 semi-freehand cutting is seen with lettering and art 47 and cutter 42.

With reference to FIG. 4 again shown also is that the new inventive system can cut several wood joints. Shown is the cut from the opposite edge across the wood without stopping. The bit is in, notch 32 and a rabbet joint 46 at the far edge. Dado 45 is 90 degrees and cut in one operation; one cut FIG. 4 is showing the bit having made a through cut because of notch 32, allowing bit entry, which is showing in FIG. 4. Horizontal cuts, miter joints, dados, rabbets, laps, and others; any angle within the plate 3 span can be cut with ease because sleeve 5 is attachably detachable to slotted plate 3 which is pivotble. FIG. 4 also shows the position of all parts as assembled, except for the radius plate 23 to and with said miter gauge 1 when properly set up for use doing any of it's operations. In this position the router should be attached for use.

With reference to FIG. 8. the front view of the miter gauge fully set up with sleeve 5, slotted plate 3 protractor 2 and bit notch 32 is shown. Fasteners 56 serve a double purpose in that they are also a safety feature obstructing any uninvited fingers when making such frontal pressure cuts as horizontals.

With reference to FIG. 9; shown is the side view of the miter gauge. Sleeve 5 is shown as sleeve 27 to Illustrate that sleeve 5 and beam 8 may be of any shape and multi-purpose fastener 48 and/or 56 is adjustable because of adjustable lock washers for personal tightness.

Attachable, adjustable for personal tightness component and also a safety feature.

Figure 10:
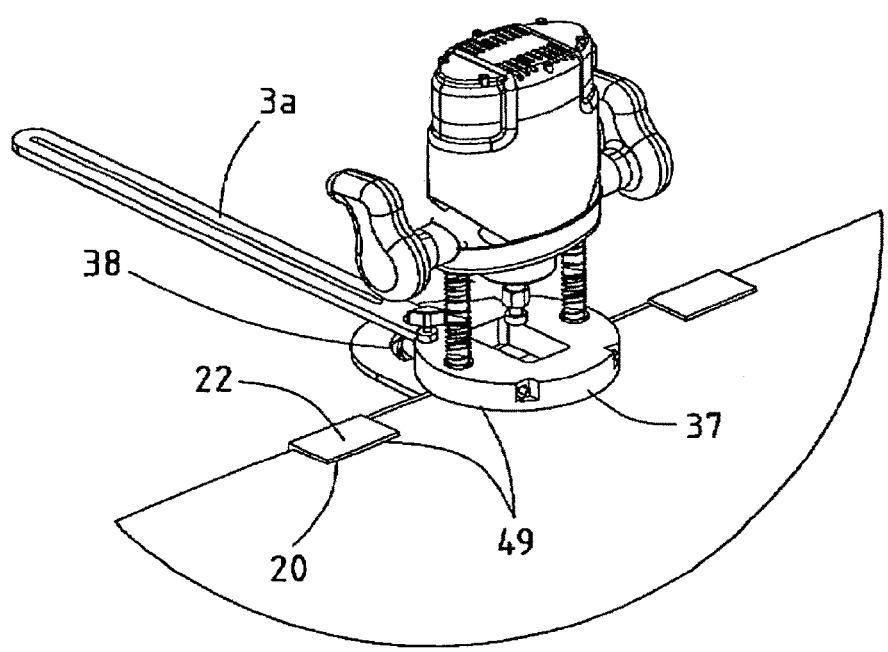
FIG. 10 Shows a pictorial view of an unattached router in position in front of a clamped miter gauge to a surface with only the slotted sleeve plate attached showing why router slides onto miter gauge.

With reference to FIG. 10 it is simply shown how a router sits on the same plane as 20 of top clamp plates 22 and router base 37 and 3a indicated by 49.

Figure 11:
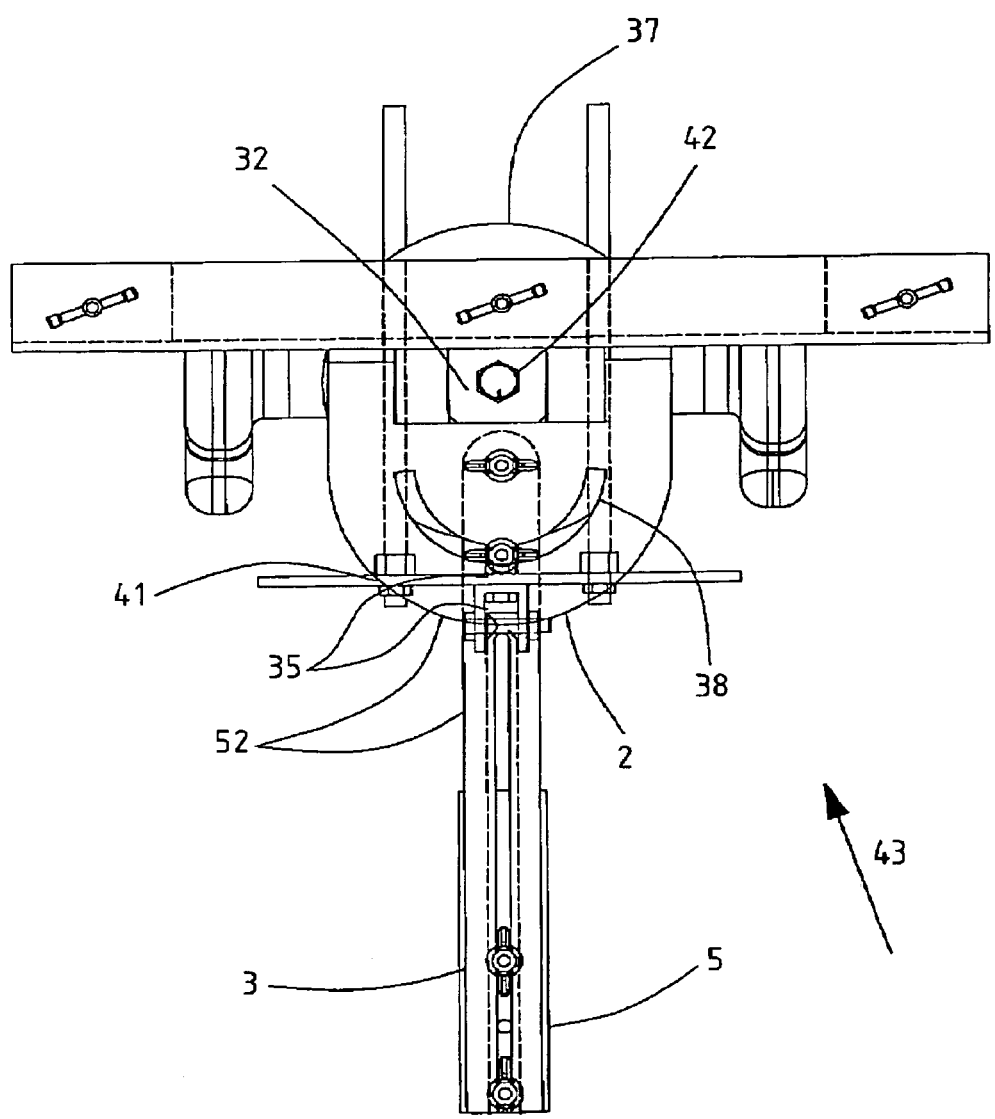
FIG. 11 Shows the orthographic view of a router fully engaged with the inventive universal route system with all its parts, except the radius plate, engaged with router on top of sleeve plate of miter gauge.

With reference to FIG. 11, 43 is a top view signifying the entirety of FIG. 11 with 52 showing that router base 37 is sitting on 3a of slotted sleeve plate 3 on protractor 2 with bit or cutter 42 in the center of bit notch 32 showing that router 37 is over half way on top of miter gauge for what the inventor believes to be a totally new concept for a router system to be able to make through dado 45 cuts, one of the most difficult wood joints to set up for and cut with a router, without setting up a fence or cutting from both edges of the wood or any other machine or by hand. This as well as all of its other functions as a multi-functional router system.

With reference again to FIG. 4, this same setup but with sleeve 5 adjusted to its most foreword point or that desired, with adjustments 13 and 34 for settings of sleeve 5 different angles are cut. To cut arcs with miter gauge as center adjust 18, 34 and 13 if necessary, tighten posts 30 and loosen sleeve 5 and cut arcs. By adjusting 18, 34, and 13 to desired position and loosening miter gauge 1 clamp posts 30 and holding said miter gauge 1 tightly against wood and holding router 37 firmly, slide both miter gauge 1 and router 37 simultaneously to cut horizontals as for rabbets also shown in FIG. 4.

With this new inventive system having been disclosed and described it should be well understood that a new most flexible universal router system has been disclosed. The new system does more operations faster, set up time is far less and with little time one learns how to do the various operations easily and with very positive results. Said system will work with most if not all routers as there other ways to attach the router to the beam in the system. It is the only attachment anyone needs and one can take that old router out of moth balls and finally put it to use. All they have to learn is adjustments and clamps. Junior and senior high schools will now be able to make asthetically appealing projects as signs for the cottage, do them well and be proud. Home hobbyists will have fun with it. Above all, this a much safer system, in fact the safest system ever and also important, the only now complete system ever. Thus, by using this inventive system, it's operations include at least the following:

[1] Through straight line cuts in one operation, allowing for:
a) Dados
b) Rabbets
c) Laps
d) Miters
e) Tenons
[2] Arcs with centers on and of wood.
[3] Small to very large circle
[4] Hoizontals
[5] Semi-freehand lettering any style
[6] Semi-freehand pictures
[7] Plane opposite edge
[8] Mechanical lettering
[9] Mechanical pictures
[10] Complex scenery

I claim:

1. A universal router system comprising:
   a clamping system for clamping to a suitable material comprising top clamp plates with a notch between;
   a miter gauge body having a protractor part with an arcuate slot therein for guiding pivotal movement for angular settings of a sleeve and sleeve plate for cutting different designs;
   said sleeve plate comprising a threaded passageway configured for alignment with said arcuate slot and attachment to top of said protractor defining a central pivotal point;
   a sleeve comprising threaded bores for detachably coupling to said sleeve plate with threaded fasteners and an aligned opening passage for receiving a slidable beam;
   locking beam means for locking said slidable beam within said sleeve at a selected position;
   said slidable beam attached to a hinged router attaching device at one end;
   said hinged router attaching device comprising attachment member rods for attaching a router adjustably coupled within arm slots of a T-Bar member;
   wherein adjustment of coupling of said sleeve with said sleeve plate allows for a router bottom surface to slide on top of said sleeve plate and a bit extending therefrom through said notch.

2. The universal router system of claim 1, wherein said T-Bar member further comprises a vertical slot for adjustable router attachment thereto.

3. The universal router system of claim 1, wherein said slidable beam is configured as multiple slidable telescoping segments connected within said sleeve.

* * * * *